J. S. FISH.
Lamp.
No. 5,146.
Reissued Nov. 19, 1872.
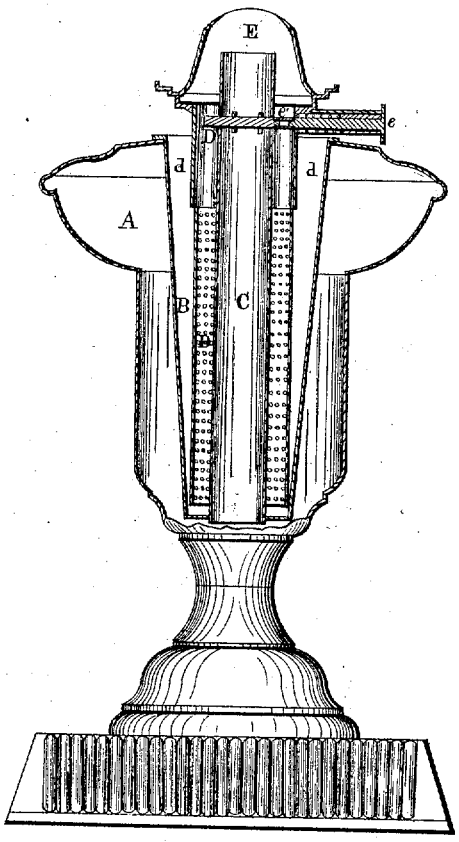
Witnesses.
C. A. Pond
A. F. Cornell.
Inventor.
J. S. Fish.
Per. Burridge & Co.
Attys.
AM. PHOTO-LITHOGRAPHIC CO. N.Y. (OSBORNE'S PROCESS.)

UNITED STATES PATENT OFFICE.

JOHN S. FISH, OF CLEVELAND, OHIO, ASSIGNOR TO THOMAS H. WHITE.

IMPROVEMENT IN LAMPS.

Specification forming part of Letters Patent No. 102,240, dated April 26, 1870; reissue No. 5,146, dated November 19, 1872.

*To all whom it may concern:*

Be it known that I, JOHN S. FISH, of Cleveland, in the county of Cuyahoga and State of Ohio, have invented certain Improvements in Non-Explosive Lamps, of which the following is a specification:

The nature of this invention relates to the construction of a non-explosive lamp for burning any of the volatile oils, it being so constructed that a current of cold air passes down and around the wick-tube, thus effectually cutting off the possibility of heat being conveyed to the bulk of oil in the lamp.

The figure is a vertical section of the following-described lamp.

In the drawing, A represents the body or fount of a lamp, which may be made in the form shown or of any other suitable shape. In said fount is a chamber, B, closed at the bottom. From said bottom and extending up through the chamber is a wick-tube, C. A straight tube, D, surrounds the wick-tube C. The upper part D′ of said tube D is plain or close, whereas the lower part thereof is perforated, as shown in the drawing. The lower end of the wick-tube fits closely in the bottom of the chamber B, thereby the end is secured steadily in position. The upper end of the tube D is held by the ribs or flanges *d d*, which rest against the sides of the chamber. To the top of the tube D is secured the cone E of the burner. The tube D may be withdrawn from the chamber B, when desired. The shaft of the wick-wheel is made in two parts, the thumb-piece *e* having a square socket in it at *e′*, in which the wheel portion rests. A small spiral spring, *c*, embracing the socket portion, keeps it in place. This part of the device for raising the wick is attached to the tube D, the other part being secured to the wick-tube C.

The practical operation of this lamp is as follows: The external air which feeds the flame passes in at the opening in the top of the chamber B, surrounding the tube D, in the direction indicated by the arrows, and, passing through the perforations of the tube D, is thoroughly distributed along its whole length, equalizing the flow of air and keeping the whole at a low state of temperature, thence up into the burner E. By this means a constant influx of external air is caused at the point where most needed, and effectually cuts off any communication of heat from the burner to the body of the lamp. The air is therefore made to serve two purposes at the same time. By the use of the tube D the air is more evenly fed to the flame, and will prevent any sudden flashes of flame from puffs of air from without. In this manner of construction, too, the burner sets near the body of the lamp, which is essential in obtaining a good light.

Having described my invention, what I desire to secure by Letters Patent is—

1. The tube D, having its lower portion perforated and its upper part D′ whole and provided with flanges *d d*, substantially as and for the purpose described.

2. The tube D, in combination with the tube or chamber B in a lamp, when the parts are constructed and arranged substantially as described, and for the purpose set forth.

JOHN S. FISH.

Witnesses:
J. A. WAGGENER,
G. GAGE, Jr.